No. 723,826. PATENTED MAR. 31, 1903.
E. BUYSSE.
APPARATUS FOR ASSORTING POTATOES, FRUITS, OR THE LIKE.
APPLICATION FILED APR. 8, 1902.
NO MODEL.
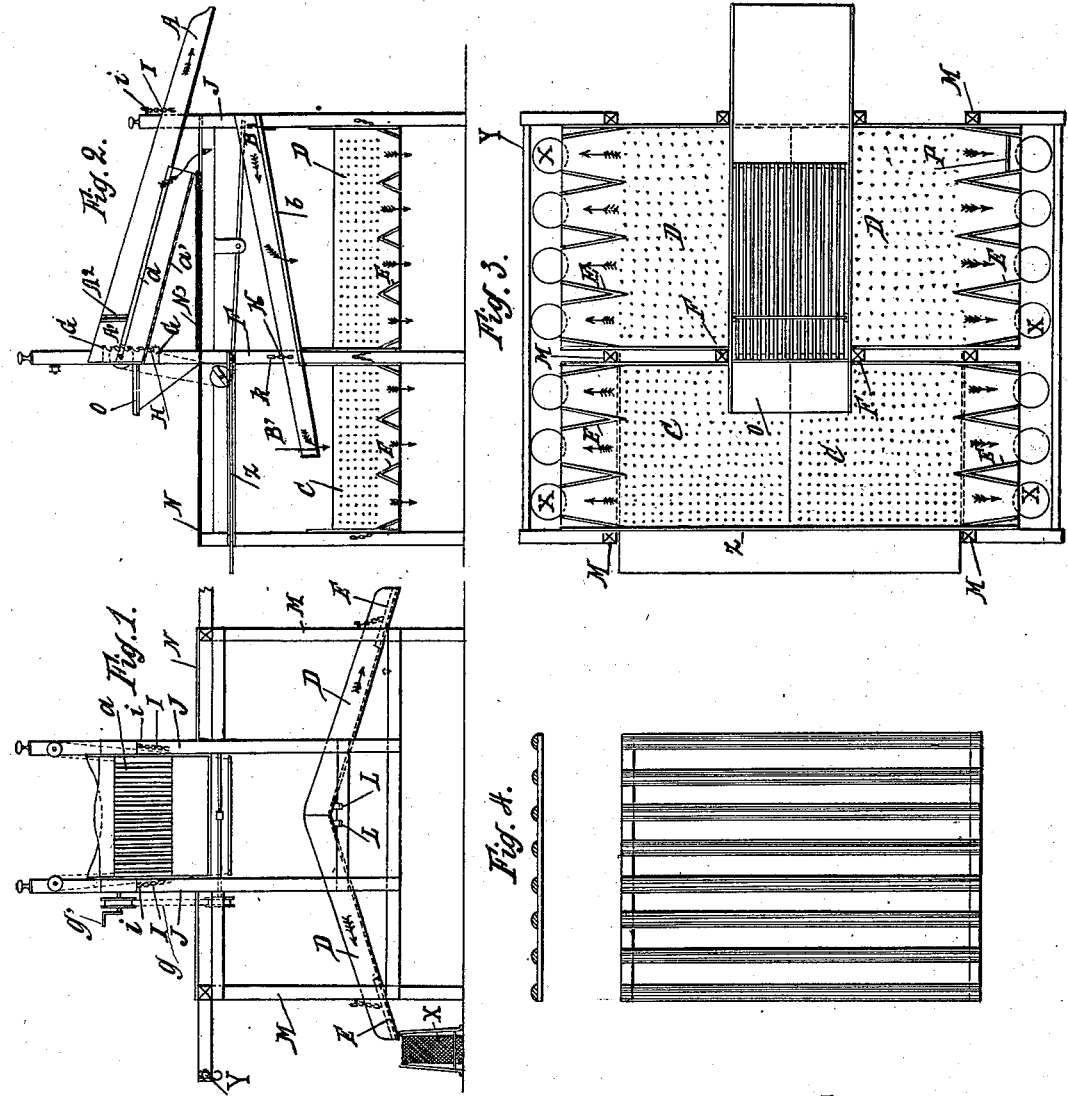
Witnesses:
E. B. Bolton
Adelaide Claire Gleason
Inventor:
Emile Buysse
By Richardson
his Attorneys,

UNITED STATES PATENT OFFICE.

EMILE BUYSSE, OF BASSEVELDE, BELGIUM.

APPARATUS FOR ASSORTING POTATOES, FRUITS, OR THE LIKE.

SPECIFICATION forming part of Letters Patent No. 723,826, dated March 31, 1903.

Application filed April 8, 1902. Serial No. 101,930. (No model.)

*To all whom it may concern:*

Be it known that I, EMILE BUYSSE, a citizen of the Kingdom of Belgium, residing at Bassevelde, Belgium, have invented certain new and useful Improvements in Apparatus for Sorting Potatoes, Fruits, or the Like; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The subject-matter of my invention consists of an apparatus for sorting potatoes, peas, fruit, and the like. In order that it may be readily understood, I will describe the apparatus hereinafter as applied to the sorting of potatoes.

My improved apparatus is so constructed and operated that the sorting is effected automatically—that is to say, after having emptied a certain quantity of potatoes into the apparatus they will be sorted without further trouble into three kinds—*i. e.*, first, the largest, intended for sale; secondly, those of medium size, for planting, and, thirdly, the smallest, intended for feeding cattle—and also delivered automatically into open sacks placed around the apparatus.

My invention affords especially the great advantage of clearing the potatoes of the earth which nearly always adheres to them and which earth will not therefore, as hitherto, increase the price of the goods by two to five per cent., as its weight is always weighed at the same price as that of the goods themselves. The sorted potatoes are particularly appreciated in the households of the working classes, who are large consumers of potatoes.

The accompanying drawings illustrate my apparatus by way of example.

Figure 1 is a front view. Fig. 2 is a sectional side elevation. Fig. 3 is a plan view, and Fig. 4 shows in vertical cross-section and plan a grid hereinafter mentioned.

The apparatus is composed of a first grid or sieve A, upon which a hopper A' is formed by means of a partition A², which latter is capable of sliding in a groove and is adjustable to enable the descent of the potatoes to be regulated. This sieve comprises a grid $a$, such as at Fig. 4, beneath which is a perforated metal sieve $a'$. The largest potatoes falling from the hopper A' roll onto the grid $a$, and from thence they are collected in wagons, carts, or in boats or large receptacles. The other smaller potatoes fall through the lattice of the grid onto the perforated metal sieve $a'$, which conveys them to a second grid B, mounted below the first one, and, like the latter, also inclined, but in a contrary direction. This grid B has simple grid-bars $b$ of the same kind as $a$, but the lattice is closer. The middle-sized potatoes fall onto and are delivered from this sieve B, while the smallest ones fall through the lattice. The middle-sized potatoes after rolling down the sieve B fall upon a double-inclined plane C C, of perforated sheet metal, mounted transversely to and beneath the end of the sieve B. The smallest potatoes passing through the grid of the sieve B fall upon a second double perforated inclined plane D D, constructed and arranged after the same manner as C C. The two double-inclined planes are fitted at their outer ends with ridges E E, placed obliquely to form furrows, in which the potatoes are received, so as to fall thence into the open sacks X, hung around the apparatus by means of sack-supports in any convenient manner.

The central supports F F of this apparatus are provided at their upper part with toothed racks G G, the teeth of which engage a rod H, sliding in eyes, which is provided beneath the hopper, so as to regulate the degree of inclination of the sieve, which inclination is also regulated at the other end by means of chains I I, fixed to each side of the sieve. The links of the chains engage with the hooks $i\,i$, fixed to the supports J J. Upon the central supports are likewise mounted pulleys connected by an endless chain $g$ for the purpose of imparting a vibratory movement to the inclined planes A and B and which can be set in motion at pleasure by the aid of the crank $g'$. Similar devices may be adopted for all the other trays if it be desired to impart a vibratory movement to them also, the top being capable of being actuated by the aid of a single crank operated by any suitable driving mechanism.

The inclination of the sieve B is regulated by chains K K, attached to its lower end and hooked onto hooks k k, fixed to the central supports F F. The inclination of the double-inclined planes C C and D D, the parts of which at their points of junction rest upon two longitudinal bars L L, is regulated in the same way by means of chains and hooks on the supports M M.

The potatoes in their course are freed from the earth adhering to them, which passes through the perforations of the metal sheet $a'$ and falls upon the plate N, placed below the sieve A, as well as through the perforations of the double-inclined planes C C and D D, whence it falls to the ground.

The sieve A occupies the central upper portion of the apparatus, and all around it the plate N extends, upon which may be arranged the sacks for the potatoes to be sorted.

Upon the central supports F F is arranged a supporting-plate O, solidly held by an iron bracket and adjustable with respect to height and designed to receive the sacks, so that they may be more easily emptied.

X X X represent the sacks distributed around the apparatus below the furrows and ready to receive the sorted potatoes.

Y represents a frame placed right and left of the apparatus, and to which may be fixed cords for holding the sacks open where no special sack-supports are employed.

When the sacks are filled with the sorted potatoes, any more potatoes are prevented from rolling down the furrows by means of plates, such as P, Fig. 3, which are placed across the said furrows, the plates being removed when fresh empty sacks have been placed below the furrows.

$z$ is a plate which extends outwardly from the apparatus for the purpose of facilitating the delivery of the potatoes to be sorted from the carts or wagons and is capable of being pushed in beneath the plate N when not required for use.

In place of the sieve $a'$ a woven-wire cloth may be stretched, or light iron bars may be employed, which free the potatoes from the earth better in rainy weather. Likewise the perforated metal sheet of the double-inclined planes C C and D D may be also replaced by woven wire.

In cases where the sorting of the potatoes is not sufficiently rapid, which may happen with potatoes coming from very clayey ground and in very damp or rainy weather, the shaking mechanism $g\ g'$ may be set in motion, so as to shake the sieve A from time to time.

In order to prevent the middle-sized potatoes from rolling too far along the double-inclined plane C or from being thrown out of the apparatus, I furnish the sieve B with an end piece B', forming a stop and placed sufficiently far forward to form a kind of trap, from which the potatoes will fall upon the said inclined plane C.

It is obvious that although my apparatus has been described as applied to the sorting of potatoes it may be applied to all kinds of vegetables, fruit, grain, &c.—such, for example, as oranges, figs, olives, coffee-berries, &c.—the apparatus remaining the same and the various proportions only differing according to the materials to be treated. In the case of delicate materials—such as oranges, for example—the bars of the sieves may be replaced by tubes or strips of caoutchouc instead of being made of wood.

My automatic sorter whatever sort of product it may be intended for may easily be mounted upon a suitable carriage, thus allowing the apparatus to be moved about to any desired place. The apparatus for working it may or may not be mounted on the carriage.

At the discharge end of the upper sieve A there may be adapted any kind of hopper (not shown in the drawings) to permit of direct loading of the materials treated into wagons or boats or bins, &c.

Having now particularly described and ascertained the nature of my said invention and in what manner the same is to be performed, I declare that what I claim is—

In a separating device of the class described, a primary inclined separating-surface, a second surface beneath the same and inclined in the opposite direction, a third separating-surface inclining laterally in opposite directions and having its edge extending longitudinally beneath said second surface, means for adjusting the inclination of said third surface, and agitating means, substantially as described.

In testimony that I claim the foregoing as my invention I have signed my name in presence of two subscribing witnesses.

EMILE BUYSSE.

Witnesses:
 JULES EGO,
 CHARLES DE GRÉVE.